US009179254B1

(12) United States Patent
Viswanadham

(10) Patent No.: US 9,179,254 B1
(45) Date of Patent: Nov. 3, 2015

(54) MOTION DETECTION WITH BLUETOOTH LOW ENERGY SCAN

(71) Applicant: Google Inc., Mountain View, CA (US)

(72) Inventor: Prerepa V. Viswanadham, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/328,005

(22) Filed: Jul. 10, 2014

(51) Int. Cl.
*H04B 7/00* (2006.01)
*H04W 4/02* (2009.01)
*H04W 4/00* (2009.01)

(52) U.S. Cl.
CPC ............... *H04W 4/02* (2013.01); *H04W 4/008* (2013.01)

(58) Field of Classification Search
USPC ............................ 455/41.2, 41.3, 404.2, 414.2
See application file for complete search history.

(56) References Cited

U.S. PATENT DOCUMENTS

2011/0244798 A1* 10/2011 Daigle et al. ................ 455/41.2
2013/0165044 A1*  6/2013 Xie et al. ..................... 455/41.2

* cited by examiner

*Primary Examiner* — Ayodeji Ayotunde

(57) ABSTRACT

An example method for providing motion detection via a Bluetooth low energy scan is disclosed. In particular, the method includes performing a scan via a Bluetooth unit of a computing device. Further, the method includes receiving one or more advertisement packets via the Bluetooth unit in response to the performed scan. The one or more advertisement packets may be associated with a respective Bluetooth device. Yet further, the method includes determining if a location of the Bluetooth unit has changed based on received one or more advertisement packets. The determining includes comparing the received one or more advertisement packets with a set of one or more reference advertisement packets. In addition, the method includes enabling an application processing unit in response to determining the Bluetooth unit has changed location. The application processing unit may be configured to determine the location of the Bluetooth unit.

20 Claims, 8 Drawing Sheets

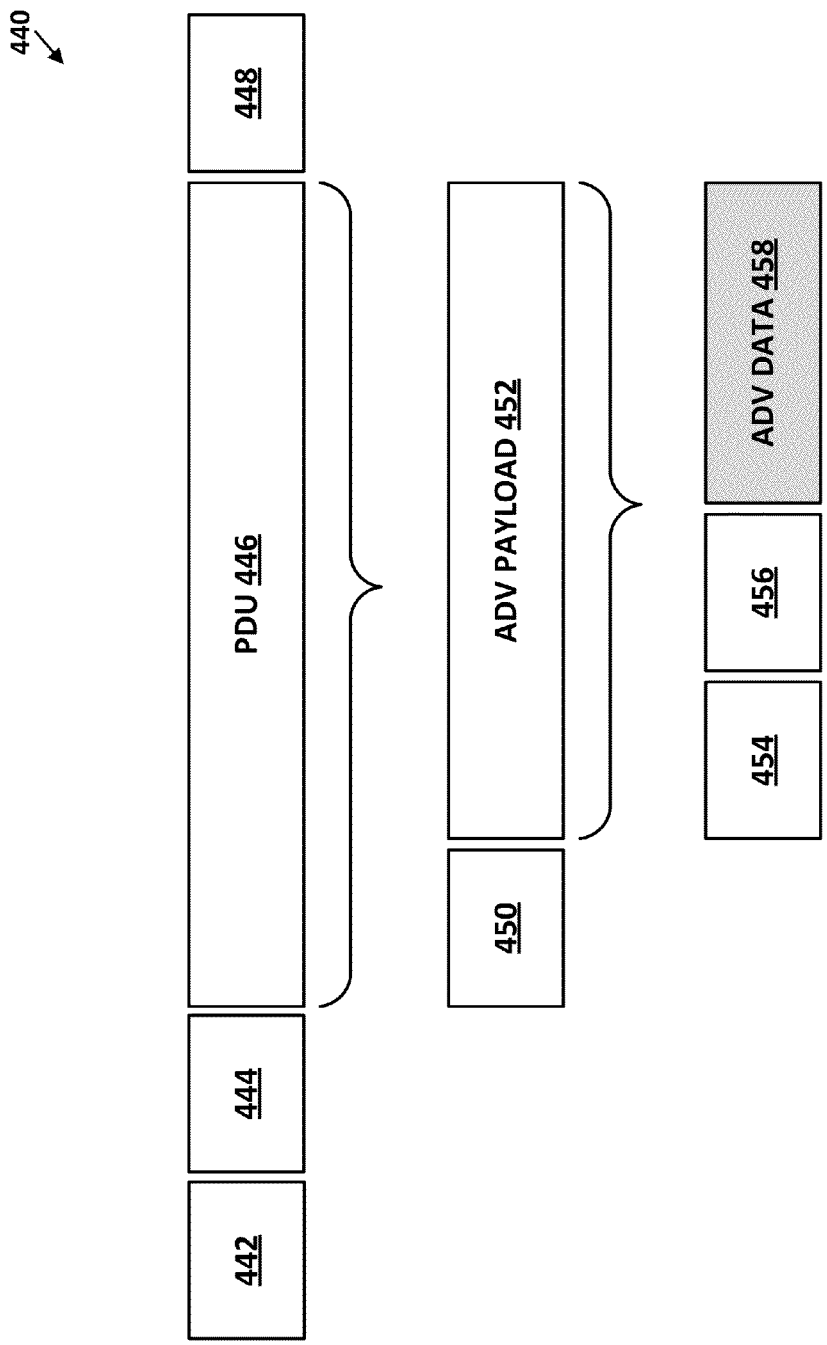

MOTION DETECTION WITH BLUETOOTH LOW ENERGY SCAN

BACKGROUND

Unless otherwise indicated herein, the materials described in this section are not prior art to the claims in this application and are not admitted to be prior art by inclusion in this section.

Portable computing devices such as personal computers, laptop computers, tablet computers, smart phones, wearable computers, and countless types of Internet-capable devices are prevalent in numerous aspects of modern life. For example, it is common for a single consumer to operate a smart phone, a laptop computer, a keyboard, and a mouse, possibly simultaneously. With increasing consumers of multiple portable devices, the demand for wireless technology continues to play a role in the use of such portable devices. As such, various forms of wireless technology have evolved to locally connect these portable devices for numerous applications. One wireless technology standard for exchanging data between multiple portable devices is popularly known as Bluetooth.

Bluetooth is commonly used for wirelessly connecting a portable device with one or more other portable devices over a short range. For example, Bluetooth may be used to connect a cell phone to a wireless headset, possibly allowing for hands-free use of the phone. In some instances, Bluetooth may also be used to connect the cell phone to the audio speakers and a microphone of a motor vehicle, possibly allowing for hands-free use of the phone while operating the vehicle. Thus, numerous applications have allowed Bluetooth to grow as the standard wire-replacement protocol. In multiple applications, Bluetooth remains particularly attractive due to its low-cost solutions and protocols designed for low power consumption.

SUMMARY

Example embodiments herein disclose methods, computing devices, and computer-readable media capable of providing motion detection via a Bluetooth low energy scan. By using a Bluetooth low energy scan to detect motion, motion detection components that use more energy than a Bluetooth low energy scan may be disabled until motion is detected.

In one example, a method is provided. The method includes receiving one or more advertisement packets via a Bluetooth unit of a computing device. The one or more advertisement packets may be associated with a respective Bluetooth device. Yet further, the method includes determining if a location of the computing device has changed based on received one or more advertisement packets. The determining includes comparing the received one or more advertisement packets with a set of one or more reference advertisement packets. In addition, the method includes enabling a location detection function of an application processing unit in response to determining the computing device has changed location.

In another example, a computing device is provided. The computing device includes both one or more processors and a Bluetooth unit. The Bluetooth unit may contain both a transmitter and a receiver. The transmitter may be configured to perform a Bluetooth scan. The receiver may be configured to receive one or more advertisement packets. Each of the one or more advertisement packets may be associated with a respective Bluetooth device. The computing device may also include an application processing unit configured to determine a location of the computing device. Further, the computing device may also include a computer readable medium having stored thereon program instructions that when executed by the one or more processors cause the computing device to perform functions. The functions include determining if a location of the computing device has changed based on received one or more advertisement packets. The determining includes comparing the received one or more advertisement packets with a set of one or more reference advertisement packets. In addition, the functions include enabling a location detection function of the application processing unit in response to determining the computing device has changed location.

In yet another example, a computing device is provided. The computing device may include a processor and a computer readable medium having stored thereon program instructions that when executed by the processor cause the computing device to perform functions. The functions include receiving one or more advertisement packets via the Bluetooth unit of the computing device. The one or more advertisement packets may be associated with a respective Bluetooth device. Yet further, the functions include determining if a location of the computing device has changed based on received one or more advertisement packets. The determining includes comparing the received one or more advertisement packets with a set of one or more reference advertisement packets. In addition, the functions include enabling a location detection function of an application processing unit in response to determining the computing device has changed location. The application processing unit may be configured to determine the location of the computing device.

These as well as other aspects, advantages, and alternatives, will become apparent to those of ordinary skill in the art by reading the following detailed description, with reference where appropriate to the accompanying figures.

BRIEF DESCRIPTION OF THE FIGURES

FIG. 4C illustrates an example advertisement packet.

DETAILED DESCRIPTION

Figure 1:
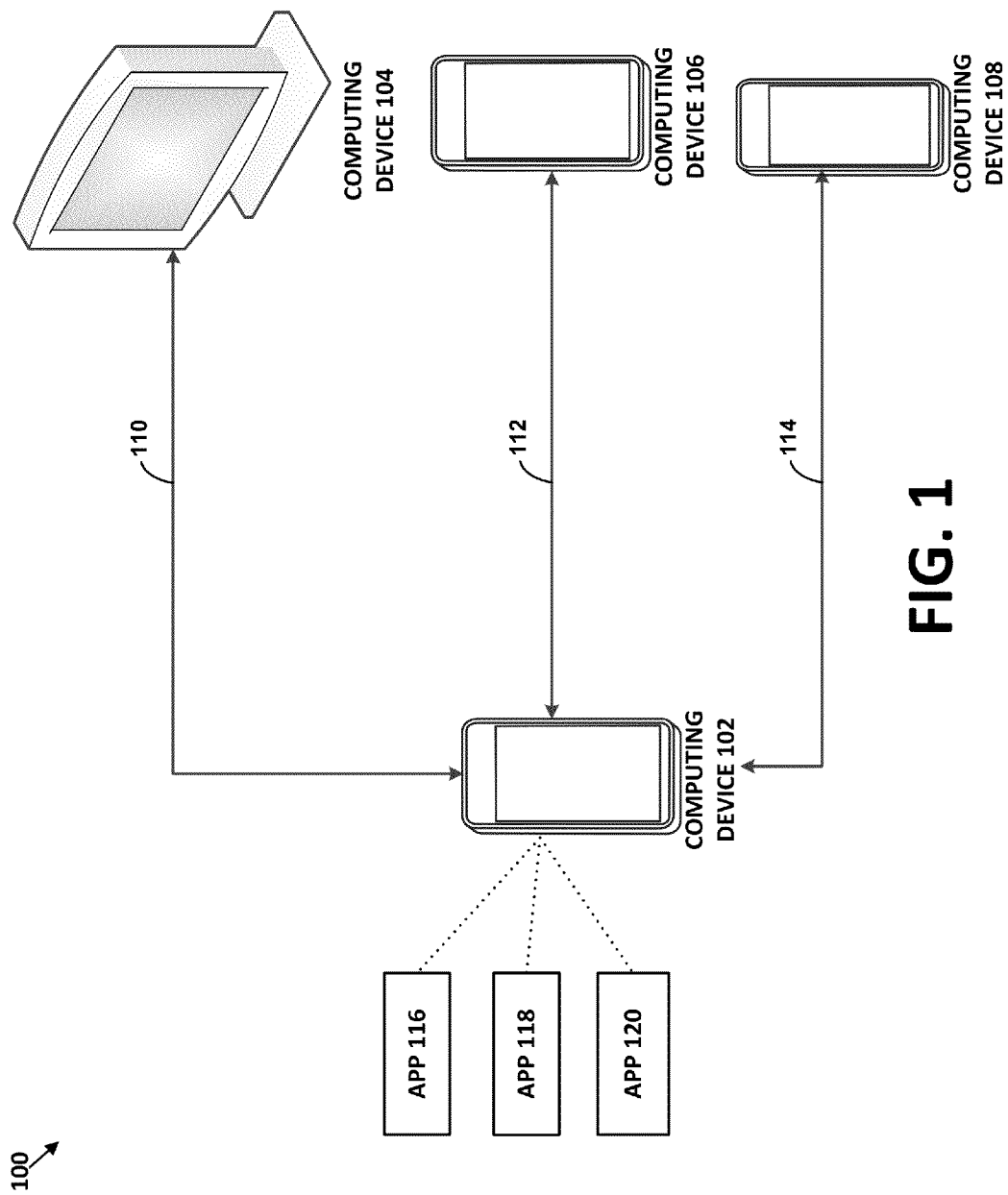
FIG. 1 illustrates an example computing device.

The following detailed description describes various features and functions of the disclosed systems and methods with reference to the accompanying figures. In the figures, similar symbols identify similar components, unless context dictates otherwise. The illustrative system and method embodiments described herein are not meant to be limiting. It may be readily understood that certain aspects of the disclosed systems and methods can be arranged and combined in a wide variety of different configurations, all of which are contemplated herein.

As noted, Bluetooth continues to grow as the standard wire-replacement protocol and remains particularly attractive due to its protocols designed for low power consumption. In particular, Bluetooth Low Energy (BLE) provides protocols for low-power devices to communicate with multiple other computing devices. For example, consider a computing device that can be powered by one or more batteries. Further, consider that the computing device utilizes BLE's protocols for communicating with other computing devices such as wireless headsets and payment devices. For example, a music-playing application on the computing device may stream music to the wireless headset. In particular, BLE's protocols may include a BLE advertising protocol (possibly referred to herein as an "advertising protocol" or "advertising packets") such that the computing device may "advertise" or announce its presence to other computing devices such as the wireless headset, possibly to "pair" or connect the computing device with the wireless headset. As such, advertising protocols are designed to allow the computing device to pair with the wireless headset while maintaining the computing device's low power consumption.

Additionally, BLE may enable the computing device to also concurrently interact with more than one device at a time. For example, a computing device may perform a Bluetooth scan in order to discover Bluetooth devices located near the computing device. When a computing device performs a wireless Bluetooth scan, the various Bluetooth devices within range of the Bluetooth scan may responsively communicate an advertising packet back to the computing device performing the scan.

There are several other advantages to BLE's advertising protocols. For example, considering the scenario above, the computing device may discover Bluetooth devices located near the computing device faster (and consuming less energy) using advertising protocols than by using other protocols. In particular, advertising protocols may be fixed to three channels of a wireless spectrum, e.g., the 2.4 GHz wireless spectrum. Thus, by not scanning the full wireless spectrum, the computing device may detect other Bluetooth devices over the three fixed channels, allowing for sending and receiving BLE advertisement packets (possibly referred to herein as "advertisement packets") faster than the other protocols.

An additional benefit of the low-power usages of advertisement packets is that a computing device may be able to use a scan for nearby Bluetooth devices to determine if the computing device has moved. By using a Bluetooth scan and receiving advertisement packets, a computing device may be able to keep additional location-detection hardware unpowered until the computing device detects movement from the Bluetooth scans. Thus, using Bluetooth scans to detect movement of the computing device may enable the computing device to use battery power more efficiently by only enabling location-detection hardware when it is needed.

Therefore, embodiments herein provide example methods, devices, and computer-readable mediums for providing motion detection via a Bluetooth low energy scan. Thus, a single device, e.g., the computing device, may receive multiple advertisement packets from multiple Bluetooth devices within the range of the Bluetooth scan of the computing device. In particular, each of the advertisement packets may include some associated data. Further, the data associated with each advertisement packet may contain data that indicates some positional information of the respective Bluetooth device that is transmitting the advertisement packet. As such, the computing device may receive at least one advertisement packet containing data that indicates some positional information of the respective Bluetooth device. Further, in the scenario above, the computing device may perform a second Bluetooth scan. The second scan may result with the computing device receiving advertisement packets from nearby Bluetooth devices. Thus, the computing device may compare both the number of received advertisement packets and the data contained within the advertisement packets to determine if the computing device has moved. If the computing device has moved, a processor in the computing device may responsively enable location detection hardware to obtain a more precise device location.

FIG. 1 illustrates an example computing device. As shown in scenario 100 of FIG. 1, computing device 102 may be illustrated a smart phone (i.e. computing device), computing device 104 may be illustrated as a digital television or a monitor, computing device 106 may be illustrated as a table computer, and computing device 108 may be illustrated as another smart phone. Yet, it should be understood that arrangements for computing devices 102 through 108 are provided in FIG. 1 are for purposes of illustration only. For example, computing device 102 may also be the computing device as described in the scenarios above, among other types of wearable computing devices. In addition, in some instances, the computing devices 102 may be a laptop computer, a tablet computer, and/or a human-interface device, among other possibilities. As such, the computing device 102 may, for example, take the form of any of the computing devices described above in relation to providing motion detection via a Bluetooth low energy scan.

Further, as shown in FIG. 1, computing device 102 may pair or connect with a number of other computing devices. For example, computing device 102 may be pair or connect to computing device 104 through connection 110. Further, computing device 102 may also pair or connect with computing device 106 through connection 112. Yet further, computing 102 may also pair or connect with computing device 108 through connection 114. In addition, connections 110, 112, and 114 may be point-to-point wireless connections such as BLUETOOTH® connections and/or Bluetooth Low Power Energy (LPE) connections, among other types of connections.

In some instances, computing device 102 may determine a number of applications. For example, applications 116, 118, and 120 may, for example, be downloaded on computing device 102. In some instances, application 116 may be a video-playing application for streaming videos from computing device 102 to computing device 104, possibly for displaying the video on a larger display of computing device 104. Further, application 118 may be a presentation application, a word application, and/or a spreadsheet application for sending information from computing device 102 to computing device 106, possibly for modifying the information using the graphical user interface (GUI) of computing device 106. Yet further, application 120 may be a smart phone application for transmitting data between computing device 102 and computing device 108. The various applications of computing device 102 may also take the form of a payment application that may communicate payment information to one of computing devices 104, 106, and 108. In yet further embodiments, applications of computing device 102 may also take the form of an application to find nearby computing devices, such as a computing device 108.

Figure 2:
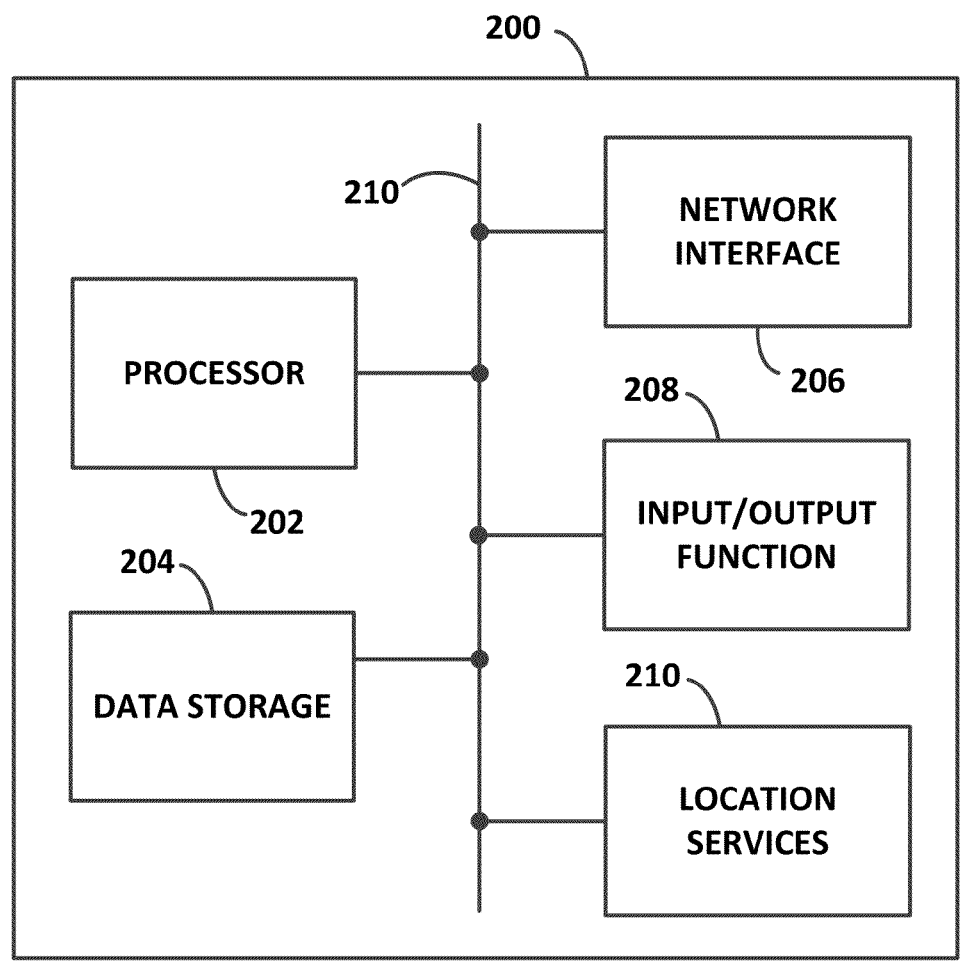
FIG. 2 illustrates a schematic drawing of an example computing device.

FIG. 2 illustrates a schematic drawing of an example computing device. In some instances, computing device 200 may, for example, take the form of any computing device described above in relation to FIG. 1 or a similar device that may be configured to perform the methods and functions described herein. In this example, computing device 200 includes a processor 202, a data storage 204, a network interface 206, and an input/output function 208, all of which may be coupled by a system bus 210 or a similar mechanism. Processor 202 can include one or more CPUs, such as one or more general purpose processors and/or one or more dedicated processors (e.g., application specific integrated circuits, digital signal processors, network processors, application processing unit, etc.).

Data storage 204, in turn, may comprise volatile and/or non-volatile data storage and can be integrated in whole or in part with processor 202. Data storage 204 can hold program instructions, executable by processor 202, and data that may be manipulated by these instructions to carry out the various methods, processes, or functions described herein. Alternatively, these methods, processes, or functions can be defined by hardware, firmware, and/or any combination of hardware, firmware and software. By way of example, the data in data storage 204 may contain program instructions, perhaps stored on a non-transitory, computer-readable medium, executable by processor 202 to carry out any of the methods, processes, or functions disclosed in this specification or the accompanying drawings.

Network interface 206 may take the form of a wireless connection, such as BLUETOOTH®. In particular, network interface 206 may enable one or more Bluetooth standards or protocols, including BLE protocols and related advertising protocols. Further, network interface 206 may include a radio for transmitting advertising packets to other computing devices. For example, referring back to FIG. 1, computing device 102 may also include network 206 to pair with computing device 104 through 106. In addition, network interface 206 may take the form of other wireless connections such as IEEE 802.11 (Wi-Fi), or a wide-area wireless connection. However, other forms of physical layer connections and other types of standard or proprietary communication protocols may be used over network interface 206. Furthermore, network interface 206 may comprise multiple physical interfaces. Further, network interface 206 may take the form of a wireline connection, such as an Ethernet connection.

Input/output function 208 may facilitate user interaction with example computing device 200. Input/output function 208 may comprise multiple types of input devices, such as a keyboard, a mouse, a touch screen, and so on. Similarly, input/output function 208 may comprise multiple types of output devices, such as a screen, monitor, printer, or one or more light emitting diodes (LEDs). Additionally or alternatively, example computing device 200 may support remote access from another device, via network interface 206 or via another interface (not shown), such as a universal serial bus (USB) or high-definition multimedia interface (HDMI) port.

Location services 210 may facilitate the computing device 200 to be able to geographically locate itself. In various embodiments, the location services 210 may take various forms. For example, location services 210 may include Global Positioning System (GPS), cellular network location, wifi-based location, or other means of locating the computing device. In some embodiments, the location services 210 may consume a relatively large amount of energy of the computing device. Thus, it may be desirable to keep the location services 210 unpowered when not in use. Further, in some instances, the location services 210 may not be able to detect GPS satellites, cellular networks, and/or wifi networks. When the location-setting means is not available, or has a very weak signal, the location services 210 may consume even more power than usual. Thus, in some situations, it may be desirable to keep the location services 210 unpowered when the computing device is in an area with a weak location-providing signal. Further, in some additional embodiments, it may be desirable to keep the location services 210 unpowered when the computing device is not in motion because the previous-known location information does not change.

In some embodiments, the computing device 200 may include a device platform or operating system (not shown). In some instances, the device platform or the operating system may be compatible with Bluetooth, Bluetooth Low Energy (BLE) protocols, and/or BLE advertising protocols. In some instances, the device platform or the operating system may be configured as a multi-layered Linux platform or operating system. The device platform may include different applications and an application framework, as well as various kernels, libraries, and runtime entities. In other examples, other formats or systems may operate the computing device 200 as well.

In some embodiments, one or more computing devices may be deployed in a networked architecture, possibly as illustrated in FIG. 1. The exact physical location, connectivity, and configuration of the computing devices may be unknown and/or unimportant to other computing devices. Accordingly, the computing devices in FIGS. 1 and 2 may be referred to as "cloud-based" devices that may be housed at various remote locations.

Figure 3:
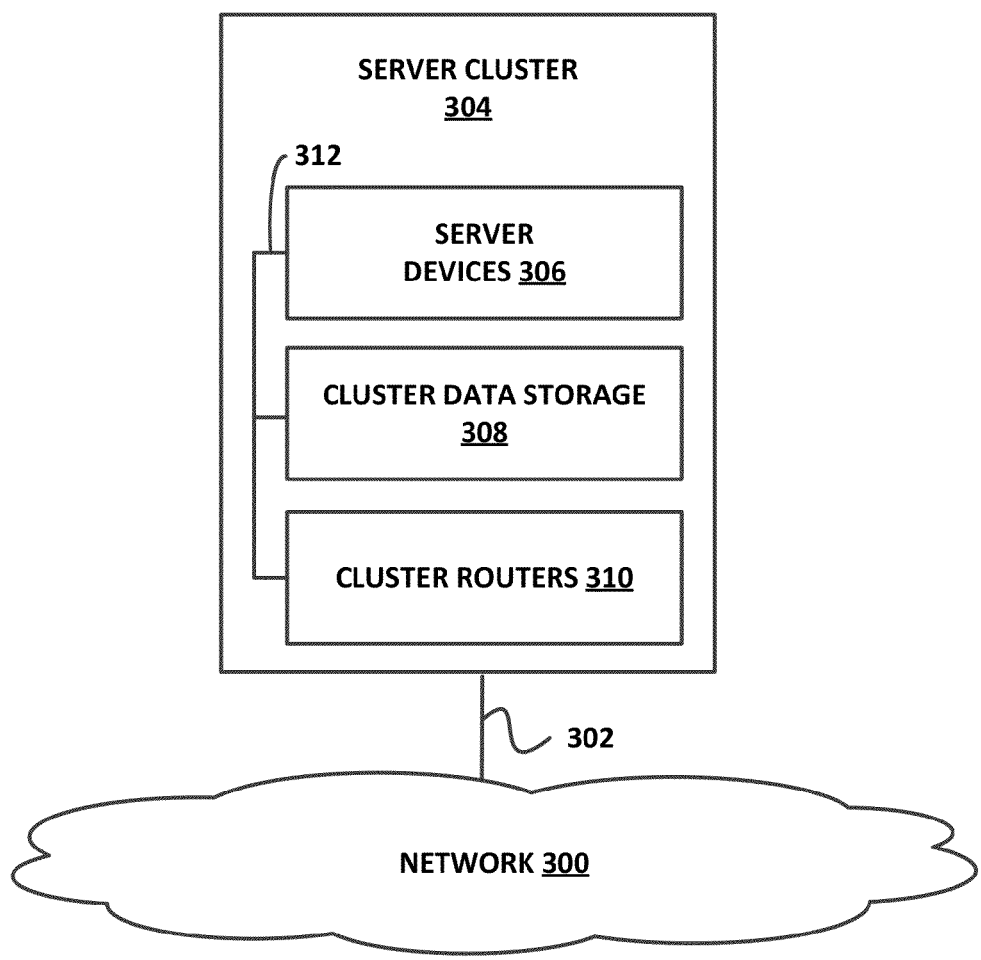
FIG. 3 illustrates a schematic drawing of an example networked server cluster.

FIG. 3 illustrates a schematic drawing of a networked server cluster. In particular, server devices 306 may, for example, take the form of any computing device described above in relation to FIGS. 1 and 2. In FIG. 3, functions of computing device 200 may be distributed between server devices 306, cluster data storage 308, and cluster routers 310, all of which may be connected by local cluster network 312. The number of server devices, cluster data storages, and cluster routers in server cluster 304 may depend on the computing task(s) and/or applications assigned to server cluster 304.

For example, server devices 306 can be configured to perform various computing tasks of computing device 200. Thus, computing tasks can be distributed between one or more of server devices 306. To the extent that these computing tasks can be performed in parallel, such a distribution of tasks may reduce the total time to complete these tasks and return a result.

Cluster data storage 308 may be data storage arrays that include disk array controllers configured to manage read and write access to groups of hard disk drives. The disk array controllers, alone or in conjunction with server devices 306, may also be configured to manage backup or redundant copies of the data stored in cluster data storage 308 to protect against disk drive failures or other types of failures that prevent one or more of server devices 306 from accessing units of cluster data storage 308.

Cluster routers 310 may include networking equipment configured to provide internal and external communications for the server clusters. For example, cluster routers 310 may include one or more packet-switching and/or routing devices configured to provide (i) network communications between server devices 306 and cluster data storage 308 via cluster network 312, and/or (ii) network communications between the server cluster 304 and other devices via communication link 302 to network 300.

Additionally, the configuration of cluster routers 310 can be based at least in part on the data communication requirements of server devices 306 and cluster data storage 308, the latency and throughput of the local cluster networks 312, the latency, throughput, and cost of communication link 302, and/or other factors that may contribute to the cost, speed, fault-tolerance, resiliency, efficiency and/or other design goals of the system architecture.

Figure 4A:
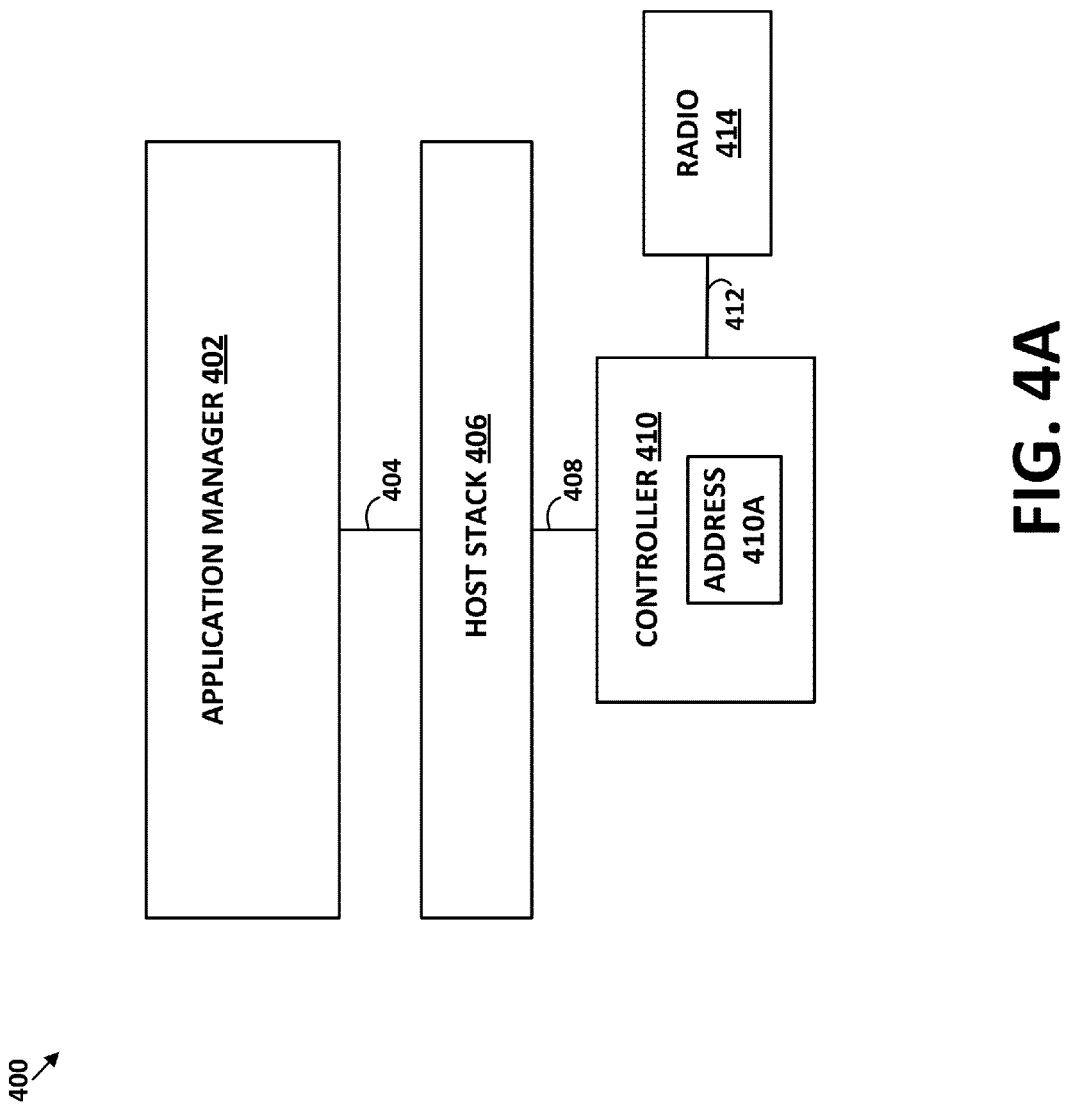
FIG. 4A illustrates a schematic drawing of an example Bluetooth device.

FIG. 4A illustrates a schematic drawing of an example Bluetooth device. In particular, Bluetooth device 400 may, for example, be combined with any of the computing devices described in the scenarios above. In some instances, Bluetooth device 400 may be incorporated into any of the computing devices described above, possibly as a Bluetooth module. For example, as in the scenarios above, Bluetooth device 400 may be incorporated into the computing device for sending advertisement packets to the wireless head set and the portable keyboard.

In this example, Bluetooth device 400 includes application manager 402, host stack 406, controller 410, and radio 414. In particular, application manager 402 may be coupled to host stack 406 by system bus 406 or a similar mechanism. Further, host stack 406 may be coupled to controller 410 by system bus 408 or a similar mechanism. Yet further, controller 410 may be coupled to radio by system bus 412 or similar mechanism.

Controller 410 may include a physical Bluetooth controller interface. Further, the physical Bluetooth controller interface may correspond to physical Bluetooth static random (BSR) address 410A, possibly for transmitting an advertisement packet for an application downloaded on the Bluetooth device 400. For example, referring back to the scenarios above, consider that Bluetooth device 400 is incorporated with the computing device. As such, the music-playing application may be downloaded to Bluetooth device 400. Further, controller 410 may correspond to BSR address 410A for transmitting an advertisement packet for the music-playing application.

Bluetooth device 400 may operate in different modes depending on the functionality. In some instances, the functionality of Bluetooth device 400 may be controlled by a user of Bluetooth device 400. Considering the scenarios above, the user may provide an input to Bluetooth device 400 or to computing device 200, possibly a computing device, that may be combined with Bluetooth device 400. In particular, the user may provide an input to input/output function 208, possibly a graphical user-interface (GUI), to initiate the music-playing application and stream music to a wireless headset. As such, the operating modes of Bluetooth 400 may include an advertising mode.

In some embodiments, the advertising mode involves the Bluetooth device 400 periodically transmitting advertising packets. Further, Bluetooth device 400 may respond with more information upon requests from other devices. In addition, Bluetooth 400 may have other modes such as a scanning mode, a master device mode, and a slave device mode. In some embodiments, the scanner mode involves Bluetooth device 400 listening for advertisement packets transmitted by other devices.

In some embodiments, the Bluetooth device 400 may be in advertisement mode to establish a connection with another computing device. For example, referring again to the scenarios above, consider that Bluetooth device 400 is incorporated with the computing device. As such, the wireless headset may scan for a desirable advertising packets sent by Bluetooth device 400. Upon receiving the advertisement packet, the wireless headset may send a pairing or connection request to Bluetooth device 400. Once the paring is established, the wireless headset may become the slave device and the Bluetooth device 400 may become the master device.

Figure 4B:
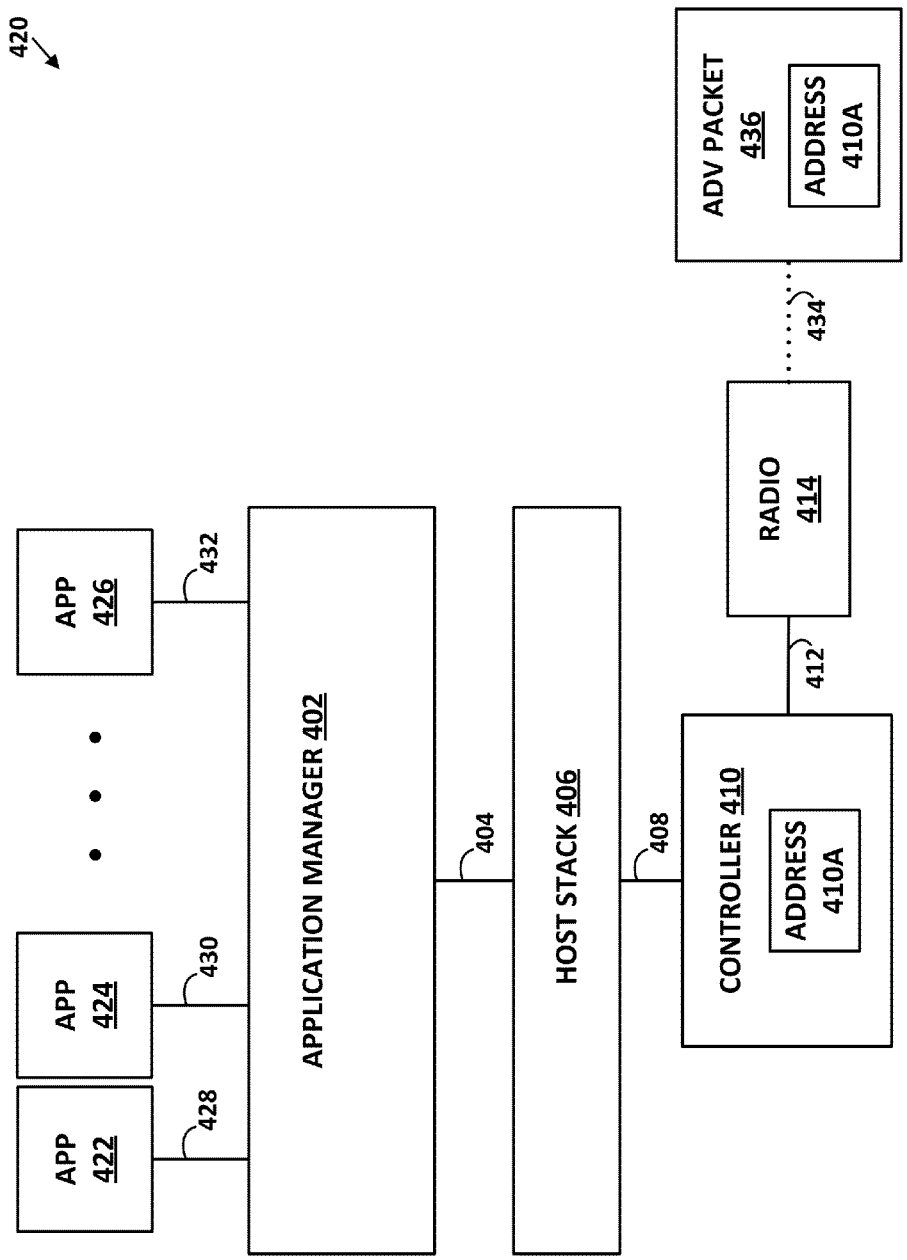
FIG. 4B illustrates a schematic drawing of another example Bluetooth device.

FIG. 4B illustrates a schematic drawing of another example Bluetooth device. In particular, Bluetooth device 420 may, for example, take the form of any of the computing devices and Bluetooth devices described above in relation to FIGS. 1 through 4A. For example, as illustrated in FIG. 4A, Bluetooth device 420 also includes application manager 402, host stack 406, controller 410, and radio 414. Further, application manager 402 may be coupled to host stack 406 by system bus 404 or a similar mechanism. Further, host stack 406 may be coupled to controller 410 by system bus 408 or a similar mechanism. Yet further, controller 410 may be coupled to radio by system bus 412 or similar mechanism.

Applications 422, 424, and 426 may be downloaded on Bluetooth device 420 and/or on a computing device combined with Bluetooth device 420. In some instances, applications 422, 424, and 426 may, for example, take the form of applications 116, 118, and 120, respectively as described above in relation to FIG. 1. Further, applications 422, 424, and 426 may exchange advertisement data with application manager 402 through application interfaces 428, 430, and 432, respectively. Further, additional applications may attempt to exchange advertisement data with application manager 402, as designated by the ellipses between applications 424 and 426. Yet further, applications 422, 424, and 426 may communicate with application manager 402 to exchange an advertisement packet with other devices (not shown in FIG. 4).

In some embodiments, Bluetooth device 420 may enter advertisement mode to transmit an advertisement packet over the air for applications 422, 424, and 426. As noted, controller 410 may be assigned a single Bluetooth static address 410A for transmitting advertisement packets to other computing devices. For example, Bluetooth device 420 may create advertisement packet 436 to include BSR address 410A. As such, advertisement packet 436 may be transmitted through radio 414 for one or more of applications 102, 104, and 106.

FIG. 4C illustrates an example advertisement packet. In particular, advertisement packet 440 may, for example, take the form of any advertisement packets described above in relation to the FIGS. 1 through 4B. In some additional embodiments, a Bluetooth tag may communicate the advertisement packet 440. A Bluetooth tag may be configured to have a fixed location and respond to Bluetooth scans with advertisement packet 440 containing location data. As shown in FIG. 4C, advertisement packet 440 may include preamble 442, access address 444, payload data unit (PDU) 446 with 2 to 39 bytes, and cyclic redundancy check (CRC) 448.

In addition, PDU 446 may include header 450 and advertisement payload 452 with 6 to 37 bytes. Further, advertisement payload 452 may include header 454, MAC address 456, and advertisement data 458 with up to 31 bytes. As noted in the scenarios above, this 31 byte space may limit the advertisement data that may be transmitted for applications 422, 424, and 426. In particular, computing device 420 may transmit a single advertisement packet 436 for possibly one or two of applications 422, 424, and 426. For example, the 31 byte space may allow for advertisement data of applications 422 and 424, but probably not application 426. In yet another example, the 31 byte space may contain location data that may be communicated via the advertisement packet. Yet, in some instances, additional applications may be present as designated by the ellipses between applications 424 and 426 in FIG. 1. As such, additional applications may encounter a waiting period to transmit advertisement data due to the 31 byte space limitation and the single Bluetooth static address 118A.

Figure 5:
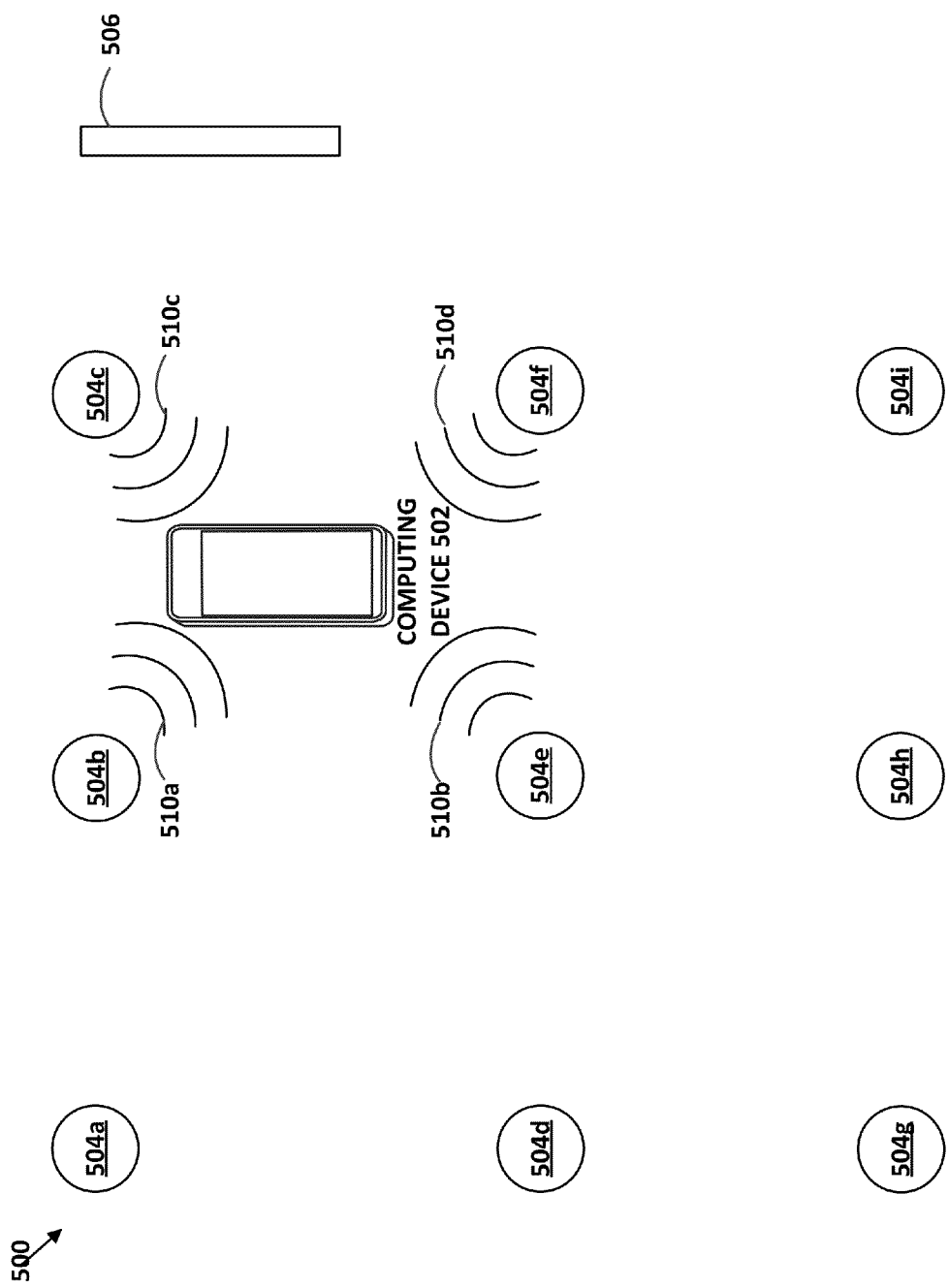
FIG. 5 illustrates a computing device located in proximity to Bluetooth devices.

FIG. 5 illustrates a scenario 500 having computing device 502 located in proximity to Bluetooth devices 504a-504i. In particular, scenario 500 of FIG. 5 may be representative of a scenario where a person in possession of computing device 502 is walking around the inside of a building. For example, scenario 500 may take place in an office building, store, etc. Additionally, scenario 500 may include the computing device 502 performing one or more steps, processes, and/or functions as illustrated by one or more of blocks 602 through 608 of FIG. 6.

A person in possession of computing device 502 may enter a building through the threshold 506. When the person enters the building, the building may prevent the standard location services (e.g. location services 210 of FIG. 2) from working correctly. For example, a building may partially block GPS signals. In another example, the building may cause the location services to use more energy than typical due to the building interfering with location detection. Thus, when operating in the building, the location services may either not work correctly, or may consume significantly more battery power than normal. Further, it may be desirable for the computing device 502 to disable its location services when the location services either are not functioning correctly or will have a high power draw.

In some embodiments, the threshold 506 of the building may be the last point at which the location services of a computing device will work correctly when a computing device enters the building. Additionally, the threshold 506 may function as reference data for the computing device. The threshold may be a point where the location services provide the mobile with correct location information. Thus, in some embodiments, it may be advantageous for the computing device to be able to compute its position relative to the threshold 506. Further, an exact location of the computing device may be calculated based on the reference data from the threshold 506 and the relative position of the computing device 502.

The store may be equipped with Bluetooth devices 504a-504i. The Bluetooth devices 504a-504i may be arranged in a grid, such as that shown in FIG. 5, or the Bluetooth devices 504a-504i may be arranged in a different layout. The Bluetooth devices 504a-504i may be configured to wait for a computing device, such as computing device 502, to perform a Bluetooth scan. In response to the Bluetooth scan, the Bluetooth devices 504a-504i may respond with advertising packets, such as advertising packets 510a-510d. In some embodiments, only the Bluetooth devices within range of the Bluetooth scan may respond with advertising packets.

When Bluetooth devices 504a-504i transmit advertising packets, each may transmit the advertising packet with location data. Depending on the specific embodiment, the location data can take many different forms. In some embodiments, each of the Bluetooth devices 504a-504i may be located on a grid system. In the grid system, each of the Bluetooth devices 504a-504i may be located at predetermined distances from each other of the Bluetooth devices 504a-504i. The grid may be symmetric (e.g. the same spacing in both forward/backward and side to side Bluetooth device spacing) or non-symmetric (e.g. a different spacing between then forward/backward and side to side Bluetooth device spacing). In additional embodiments, each of the Bluetooth devices 504a-504i may not be placed on a grid. Bluetooth devices 504a-504i may be placed with almost any spacing within a building. Thus, the actual locations of the Bluetooth devices 504a-504i may not be needed for some embodiments.

In embodiments where the Bluetooth devices 504a-504i are spaced as a grid, each of the Bluetooth devices 504a-504i may communicate an advertising packet to a computing device performing a scan including relative position information. The relative position information may include coordinate location data. The coordinate location data may take the form relative location information from a local reference point, such as the threshold 506. In one example, as shown in FIG. 5, computing device 502 is performing a Bluetooth scan.

In the layout of Bluetooth devices 504a-504i, Bluetooth device 504c is located at the top right, nearest to threshold 506. Thus, when communicating an advertisement packed to a computing device, Bluetooth device 504c may communicate the coordinate location (1,0), as Bluetooth device 504c is one position to the left of the threshold 506 and zero positions below the threshold 506. Bluetooth device 504b may communicate the coordinate location (2,0), as Bluetooth device 504b is two positions to the left of the threshold 506 and zero positions below the threshold 506. Bluetooth device 504f may communicate the coordinate location (1,1), as Bluetooth device 504f is one position to the left of the threshold 506 and one position below the threshold 506. And, Bluetooth device 504e may communicate the coordinate location (2,1), as Bluetooth device 504f is two positions to the left of the threshold 506 and one position below the threshold 506.

In other embodiments, each of the Bluetooth devices 504a-504i may communicate an advertising packet to a computing device performing a scan including global location data. The global location data may include data including geographic coordinate system data. The geographic coordinate system data may take the form of the exact coordinates on the Earth where the respective Bluetooth device is located. For example, the geographic coordinate system data may be the same type of data that is calculated by a GPS unit. In one further example, each of the Bluetooth devices 504a-504i may include either a GPS unit or have its exact coordinates programmed in. When computing device 502 performs a Bluetooth scan, it may receive the geographic coordinate system data of the various Bluetooth devices within the Bluetooth range of the computing device 502.

Figure 6:
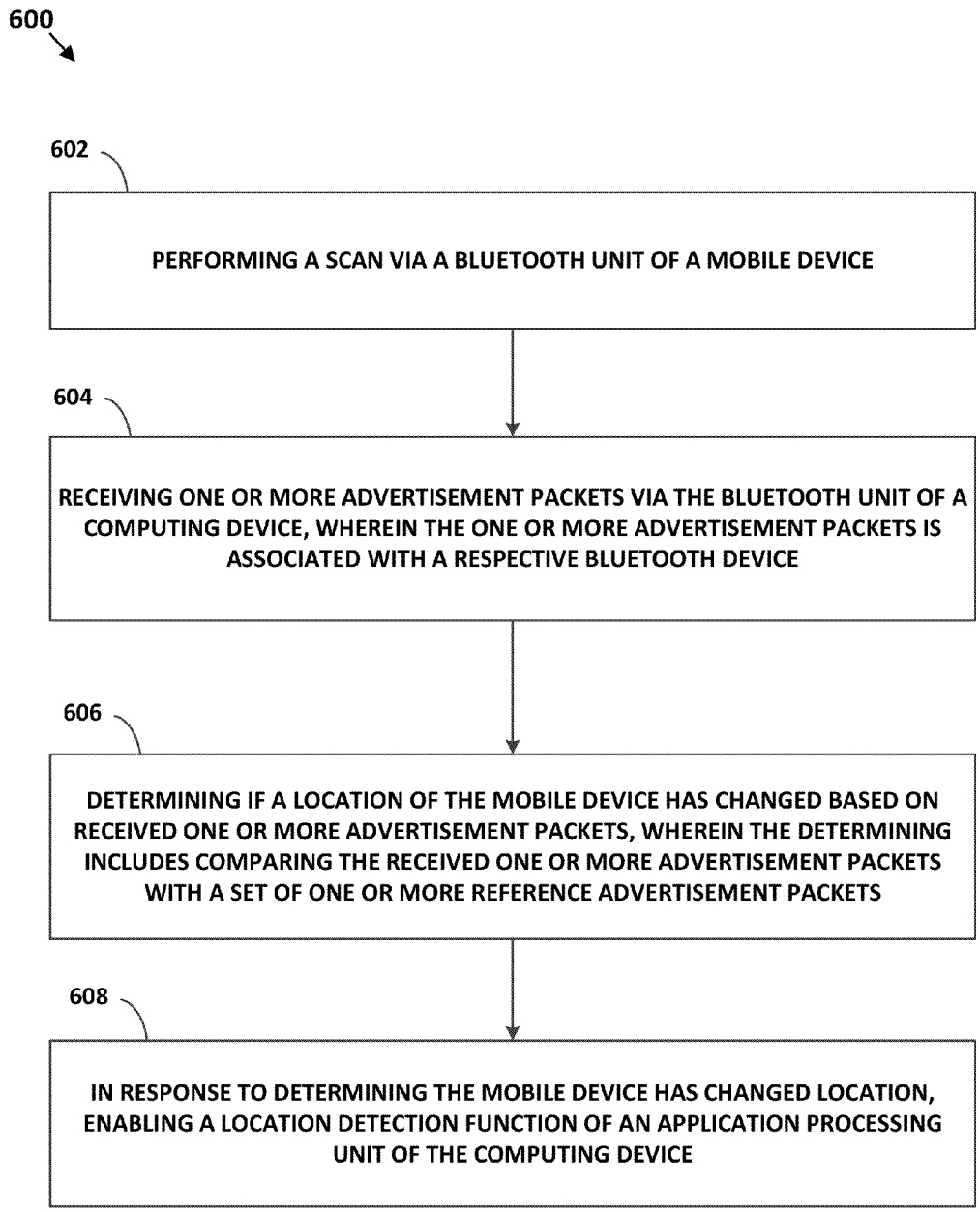
FIG. 6 illustrates a flow diagram of an example method for providing motion detection via a Bluetooth low energy scan.

FIG. 6 illustrates a flow diagram of an example method for providing motion detection via a Bluetooth low energy scan. In particular, method 600 of FIG. 6 may be carried out or implemented by one or more of the computing devices described above in relation to FIGS. 1 through 5. For example, method 600 may be carried out by computing device 502 in FIG. 5 to receive advertisement packets from Bluetooth devices 504a-504i. Further, methods 600 may include one or more steps, processes, and/or functions as illustrated by one or more of blocks 602 through 608. Although the blocks are illustrated in a sequential order, a number of these blocks may also be performed simultaneously and/or in a different order than those illustrated. Also, the various blocks may be combined into fewer blocks, divided into additional blocks, and/or removed based upon specific implementations.

At block 602, the method 600 includes performing a scan via a Bluetooth unit of a computing device. The computing device may perform a Bluetooth scan in an attempt to discover Bluetooth devices located near the computing device. Bluetooth devices within range of the Bluetooth scan may responsively communicate an advertising packet back to the computing device when the Bluetooth devices receive the scan.

The Bluetooth advertising protocol may provide several advantages for the computing device. The advertising protocol may enable the computing device to discover Bluetooth devices located near the computing device faster (and consuming less energy) than by using other protocols. In particular, the scan that causes the advertising packets to be transmitted may be fixed to three channels of a wireless spectrum, e.g., the 2.4 GHz wireless spectrum. Thus, by not scanning the full wireless spectrum, the computing device may detect other Bluetooth devices over the three fixed channels, allowing for sending and receiving advertisement packets more efficiently than the other protocols.

At block 604, the method 600 further includes receiving one or more advertisement packets via the Bluetooth unit in response to the performed scan. When a computing device performs a wireless Bluetooth scan, the various Bluetooth devices within range of the Bluetooth scan may responsively communicate an advertising packet back to the computing device performing the scan. Thus, the computing device may receive at least one advertising packet from a Bluetooth device that was in range of the Bluetooth scan. The one or more received advertisement packets may be associated with a respective Bluetooth device. Additionally, the one or more advertisement packets may include data associated with the respective Bluetooth device. The data associated with the respective Bluetooth device may include data related to a location of the respective Bluetooth device.

When Bluetooth devices transmit advertising packets, each may transmit the advertising packet with location data. Depending on the specific embodiment, the location data can take many different forms. For example, the Bluetooth devices may be configured to provide data related to a location of the respective Bluetooth device either via relative position information or geographic coordinate system data.

As previously discussed in some embodiments, each of the Bluetooth devices may be located on a grid system. In the grid system, each of the Bluetooth devices may be located at predetermined distances from each other of the Bluetooth devices. In embodiments where the Bluetooth devices are spaced as a grid, each of the Bluetooth devices may communicate an advertising packet to a computing device performing a scan including relative position information. The relative position information may include coordinate location data. The coordinate location data may take the form relative location information from a local reference point. For example, the location information may include an X- and Y-coordinate relative to a specific position.

In other embodiments, each of the Bluetooth devices may communicate an advertising packet to a computing device performing a scan including global location data. The global location data may include data including geographic coordinate system data, similar to GPS data. Thus, the geographic coordinate system data may provide an absolute location of the respective Bluetooth device on the surface of the Earth.

At block 606, the method 600 further includes determining if a location of the computing device has changed based on received one or more advertisement packets, wherein the determining includes comparing the received one or more advertisement packets with a set of one or more reference advertisement packets. The determining may be performed by various processing devices of the computing device, such as a processor of the Bluetooth unit.

In order to determine if a location of Bluetooth unit has changed, the computing device may compare received advertisement packets with reference advertisement packets. If the comparison indicates a high similarity between the received advertisement packets and the reference advertisement packets, then the mobile device may be able to determine with a high probability that the mobile device has not moved. However, if the comparison indicates a low similarity between the received advertisement packets and the reference advertisement packets, then the mobile device may be able to determine with a high probability that the mobile device has not moved.

As discussed with respect to FIG. 5, the Bluetooth devices may transmit advertisement packets containing data. In some embodiments, this data includes location information. However, in other embodiments, the data may not include location data, but rather the data may only include identifying information of each respective Bluetooth device that responds to the scan. Based on the type of data provided, the mobile device may determine if it has moved or not in different ways. In some embodiments, the mobile device may perform a first Bluetooth scan to obtain a set of reference advertisement packets. These reference advertisement packets may correspond to a location that is known by a mobile device, such as the entrance to a building. In other embodiments, the mobile device may receive data wirelessly including a set of reference advertisement packets. For example, when entering a building, a Bluetooth device may communicate a set of data that relate to reference advertisement packets that a mobile device can expect to receive when stepping foot inside the store.

Additionally, the mobile device may establish a probability that the mobile device has moved based on analyzing advertisement packets. The probability may be based on how far the mobile device thinks it has moved. In other instances, the probability may be based on an analysis of the data received from the Bluetooth devices in the respective advertisement packets.

First, if the Bluetooth devices transmit advertisement packets containing data that does not include location data, the mobile device may compare received advertisement packets and the reference advertisement packets based on both the number of received advertisement packets and the data contained in each. For example, in a given location, a mobile device may perform a first Bluetooth scan. This first scan may result in six Bluetooth devices transmitting a response advertising packet. These advertising packets may each contain a unique identifier associated with the respective Bluetooth device. The mobile device may perform a second scan at a second time. The second scan may result in five Bluetooth devices transmitting a response advertising packet, each containing a unique identifier associated with the respective Bluetooth device. The mobile device may then compare the two scans.

First, because the number of Bluetooth device responding to the scan, the mobile device may determine there is an increased likelihood that the mobile device has moved. However, the mobile device may also look at the unique identifiers for each Bluetooth device responding to the scan too. In some instances, all five Bluetooth devices of the second scan may have transmitted advertisement packets in response to the first scan too. Additionally, the mobile device may analyze the power level of each received advertisement packet. For example, the sixth Bluetooth device that was part of the first scan, but not the second scan, may have transmitted an advertisement packet that was received by the mobile device with a power level that was so low it was barely detectable. In this instance, the lack of the sixth Bluetooth device in the second scan may not be caused by motion of the mobile device. Thus, because the set of advertisement packets from the two respective scans has significant overlap, the mobile device may determine that there is a high probability that the mobile device moved.

In another example, the first scan may similarly result in six Bluetooth devices transmitting a response advertising packet and the second scan may result in five Bluetooth devices transmitting a response advertising packet. When the mobile device compares the two scans, the mobile device may determine that first scan received advertisement packets from two devices that did not have received advertisement packets in the second scan. Additionally, the mobile device may determine that second scan received advertisement packets from one device that did not have received advertisement packets in the first scan. Thus, because the set of advertisement packets from the two respective scans is non-overlapping, the mobile device may determine that there is a high probability that the mobile device moved.

In yet another example, the first scan may similarly result in five Bluetooth devices transmitting a response advertising packet and the second scan may result in five Bluetooth devices transmitting a response advertising packet. When the mobile device compares the two scans, the mobile device may determine that the advertisement packets from the two scans are from the same Bluetooth devices. Therefore, the mobile device may analyze the received power levels of the various advertisement packets, and the associated power ratios, to determine if the mobile device has moved. For example, a large change in received power ratios may indicate a mobile device has moved. However, no significant change in power ratios may indicate that the mobile device did not move.

In yet further embodiments, the Bluetooth devices may transmit advertisement packets having data that includes location information. The location information they include either relative position information including coordinate location data or global location data. If the advertisement packets contain location data, the mobile device may use either the previously-discussed methods of determining if the mobile devices moved, or the mobile device may take advantage of the location information.

For example, in a given location, a mobile device may perform a first Bluetooth scan. This first scan may result in four Bluetooth devices transmitting a response advertising packet. These advertising packets may each contain location information. The mobile device may perform a second scan at a second time. The second scan may result in four Bluetooth devices transmitting a response advertising packet, each containing location information. The mobile device may then compare the two scans.

In one example, the location information may be coordinate location data. The first scan may result in the mobile device receiving advertisement packets having data corresponding to coordinate locations (0,0), (1,0), (0,1), and (1,1). The second scan may result in the mobile device receiving advertisement packets having data corresponding to coordinate locations (0,1), (1,1), (0,2), and (1,2). Thus, the mobile device may determine the first scan is likely performed in an area near the four Bluetooth devices corresponding to (0,0), (1,0), (0,1), and (1,1) and the second scan is likely performed in an area near the four Bluetooth devices corresponding to (0,1), (1,1), (0,2), and (1,2). Therefore, the mobile device may be able to determine a movement probability based on the change in the received coordinates from the advertising packet data.

Further, the mobile device may calculate an average coordinate for each scan. For the first scan, the average is (0.5,0.5) and for the second scan the average is (0.5,1.5). Therefore, the mobile device may be able to determine a movement probability based on the change in average coordinates. In yet some further embodiments, the mobile device may calculate a weighted average coordinate based on the received power levels of the various advertisement packets.

In embodiments where the location information is global location data, the same calculations can be performed on the global location data as on the coordinate location data. In one example, when a computing device enters a building, it may use the location service on the device to obtain global location data. This global location data may act as the reference data. Once inside the building, the location services may no longer work to provide global location data, or may provide less reliable data. However, Bluetooth devices may provide global location data with the data in an advertisement packet. Thus, the mobile device may compare the global location data provided by the location services with the global location data provided by Bluetooth devices via the data in advertisement packets to determine whether or not the mobile device has moved.

At block 608, the method 600 further includes in response to determining the Bluetooth unit has changed location, enabling a location detection function of an application processing unit. The application processing unit may be configured to determine the location of the Bluetooth unit. Because the application processing unit may use additional location services hardware (such as GPS, Wifi, etc.) to determine the actual location of the computing device, it may cause the computing device to use significantly more energy that the computing device uses when location services hardware is disabled. Therefore, only enabling location services via software or hardware and/or the application processing unit only when needed may save the computing device significant power.

Thus, when the location detection function of the application processing unit is enabled, it may either perform a calculation itself to determine the exact location of the mobile device, or it may enabling location services hardware to determine the exact location of the mobile device. In either instance, the mobile device is transitioning from a lower power mode (with the application processing unit disabled) to a higher power mode (with the application processing unit enabled).

It should be noted that method 600, other steps, processes, and/or functions disclosed herein show possible implementations of example embodiments. In this regard, each block in FIGS. 4A and 4B may correspond to hardware, chipsets, and/or circuitry that are designed or wired to perform the specific logical functions in method 600. Further, each block in method 600 may represent a module, a segment, or a portion of program code, which includes one or more instructions executable by a processor for implementing specific logical functions or steps in the process. The program code may be stored on any type of computer readable medium, for example, such as a storage device including a disk or hard drive.

The computer readable medium may include a non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method comprising:
   receiving one or more advertisement packets via a Bluetooth unit of a computing device, wherein the one or more advertisement packets is associated with a respective Bluetooth device;
   determining, via a processing unit of the Bluetooth unit, that a location of the computing device has changed based on the received one or more advertisement packets, wherein the determining includes comparing a number of the received one or more advertisement packets with a number of the one or more reference advertisement packets; and
   in response to determining the computing device has changed location, enabling a location detection function of an application processing unit of the computing device.

2. The method of claim 1, wherein the data associated with the respective Bluetooth device comprises coordinate location data of the respective Bluetooth device, wherein the coordinate location data comprises relative location information from a local reference point.

3. The method of claim 1, wherein the data associated with the respective Bluetooth device comprises global location data of the respective Bluetooth device, wherein the global location data comprises data including geographic coordinate system data.

4. The method of claim 1, wherein the one or more reference advertisement packets are stored from a previous scan performed via the Bluetooth unit.

5. The method of claim 1, wherein determining whether a location of the computing device has changed further comprises calculating a movement probability based on the received one or more advertisement packets and comparing the movement probability to a threshold.

6. The method of claim 2, wherein the application processing unit is configured to determine the location of the computing device based on the coordinate location data.

7. The method of claim 2, wherein the application processing unit is configured to determine the location of the computing device based on the global location data.

8. The method of claim 1, further comprising the computing device:
   obtaining initial reference location data via the application processing unit; and
   disabling the application processing unit after obtaining initial reference location data.

9. A computing device comprising:
   one or more processors;
   a Bluetooth unit comprising a receiver configured to receive one or more advertisement packets via the Bluetooth unit, wherein the one or more advertisement packets is associated with a respective Bluetooth device;
   an application processing unit configured to determine a location of the computing device; and
   a non-transitory computer readable medium having stored thereon program instructions that when executed by the one or more processors cause the computing device to perform functions, the functions comprising:
   determining whether a location of the computing device has changed based on the received one or more advertisement packets, wherein the determining includes comparing a number of the received one or more advertisement packets with a number of the one or more reference advertisement packets; and
   in response to determining the computing device has changed location, enabling a location detection function of the application processing unit of the computing device.

10. The computing device of claim 9, wherein:
    the data associated with the respective Bluetooth device comprises coordinate location data of the respective Bluetooth device, wherein the coordinate location data comprises relative location information from a local reference point; and
    the application processing unit is configured to determine the location of the computing device based on the coordinate location data.

11. The computing device of claim 9, wherein:
    the data associated with the respective Bluetooth device comprises global location data of the respective Bluetooth device, wherein the global location data comprises data including geographic coordinate system data; and
    the application processing unit is configured to determine the location of the computing device based on the global location data.

12. The computing device of claim 9, wherein the one or more reference advertisement packets are stored from a previous scan performed via the Bluetooth unit.

13. The computing device of claim 9, wherein determining whether a location of the computing device has changed further comprises calculating a movement probability based on the received one or more advertisement packets and comparing the movement probability to a threshold.

14. The computing device of claim 9, further comprising:
    the application processing unit being configured to obtain initial reference location data via the application processing unit; and
    the functions further comprising disabling the application processing unit after obtaining initial reference location data.

15. A non-transitory computer-readable medium having stored thereon program instructions that when executed by one or more processors cause performance of functions in connection with a computing device, the functions comprising:
    receiving one or more advertisement packets via a Bluetooth unit of a computing device, wherein the one or more advertisement packets is associated with a respective Bluetooth device;
    determining, via a processing unit of the Bluetooth unit, that a location of the computing device has changed based on the received one or more advertisement packets, wherein the determining includes comparing a number of the received one or more advertisement packets with a number of the one or more reference advertisement packets; and
    in response to determining the computing device has changed location, enabling a location detection function of an application processing unit of the computing device.

16. The non-transitory computer-readable medium of claim 15, wherein:
    the data associated with the respective Bluetooth device comprises coordinate location data of the respective Bluetooth device, wherein the coordinate location data comprises relative location information from a local reference point; and the application processing unit is configured to determine the location of the computing device based on the coordinate location data.

17. The non-transitory computer-readable medium of claim 15, wherein:

the data associated with the respective Bluetooth device comprises global location data of the respective Bluetooth device, wherein the global location data comprises data including geographic coordinate system data; and the application processing unit is configured to determine the location of the computing device based on the global location data.

18. The non-transitory computer-readable medium of claim 15, wherein the one or more reference advertisement packets are stored from a previous scan performed via the Bluetooth unit.

19. The non-transitory computer-readable medium of claim 15, wherein determining whether a location of the computing device has changed further comprises calculating a movement probability based on the received one or more advertisement packets and comparing the movement probability to a threshold.

20. The non-transitory computer-readable medium of claim 15, further comprising the computing device:

obtaining initial reference location data via the application processing unit; and disabling the application processing unit after obtaining initial reference location data.

* * * * *